(12) United States Patent
Doell

(10) Patent No.: US 6,238,054 B1
(45) Date of Patent: May 29, 2001

(54) DIMMABLE LIGHTING APPARATUS

(75) Inventor: Gerhard Doell, Ulm (DE)

(73) Assignee: Patent-Treuhand-Gesellschaft fuer elektrishe Gluehlampen mbH ( * ) Notice: Subject to any disclaimer, the term of this patent is extended or adjusted under 35 U.S.C. 154(b) by 0 days.

(21) Appl. No.: 09/392,893

(22) Filed: Sep. 9, 1999

(30) Foreign Application Priority Data

Sep. 30, 1998 (DE) ............................................. 198 44 889

(51) Int. Cl.$^7$ ....................................................... F21V 7/04
(52) U.S. Cl. ............................. 362/31; 362/27; 362/269; 362/295
(58) Field of Search ................................. 362/26, 29, 31, 362/232, 269, 285, 255, 256, 260; 342/27, 35, 295

(56) References Cited

U.S. PATENT DOCUMENTS

| 2,721,256 | * | 10/1955 | Duhon ........................................ 362/35 |
| 3,399,476 | | 9/1968 | Davis ........................................ 40/130 |
| 4,244,130 | | 1/1981 | Frois ........................................ 40/442 |
| 5,309,338 | * | 5/1994 | Liu ........................................ 362/269 |
| 5,499,165 | * | 3/1996 | Holmes, Jr. ........................................ 362/31 |
| 5,645,337 | * | 7/1997 | Gleckman ........................................ 362/255 |
| 5,779,339 | * | 7/1998 | Konishi et al. ........................................ 362/31 |
| 6,050,704 | * | 4/2000 | Park ........................................ 362/31 |

FOREIGN PATENT DOCUMENTS

| 0 607 453 A1 | | 7/1994 | (EP) ................................ G02B/6/00 |
| 451969 | * | 10/1949 | (FR) ........................................ 362/31 |
| 6-186433 | * | 7/1994 | (JP) ........................................ 362/31 |

* cited by examiner

Primary Examiner—Sandra O'Shea
Assistant Examiner—Peggy C Neils
(74) Attorney, Agent, or Firm—Robert F. Clark

(57) ABSTRACT

The invention relates to a lighting apparatus having a translucent, light-diffusing panel (1), with at least one aperture lamp (2,3) arranged along one edge, extending in a straight line, of the light-diffusing panel (1) and mounted to rotate about its cylindrical axis in a mounting (6,7) and having a screen (4,5) for the at least one aperture lamp (2,3). By rotating the at least one aperture lamp (2,3) about its axis, the light input into the translucent, light-diffusing panel (1) is influenced.

16 Claims, 1 Drawing Sheet

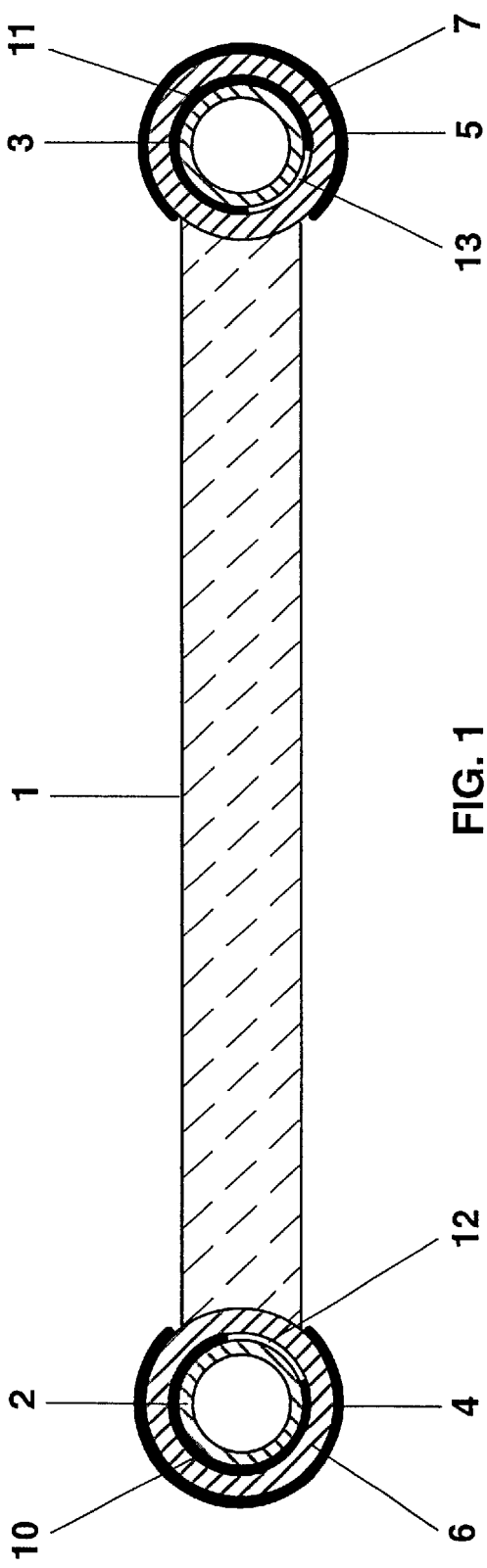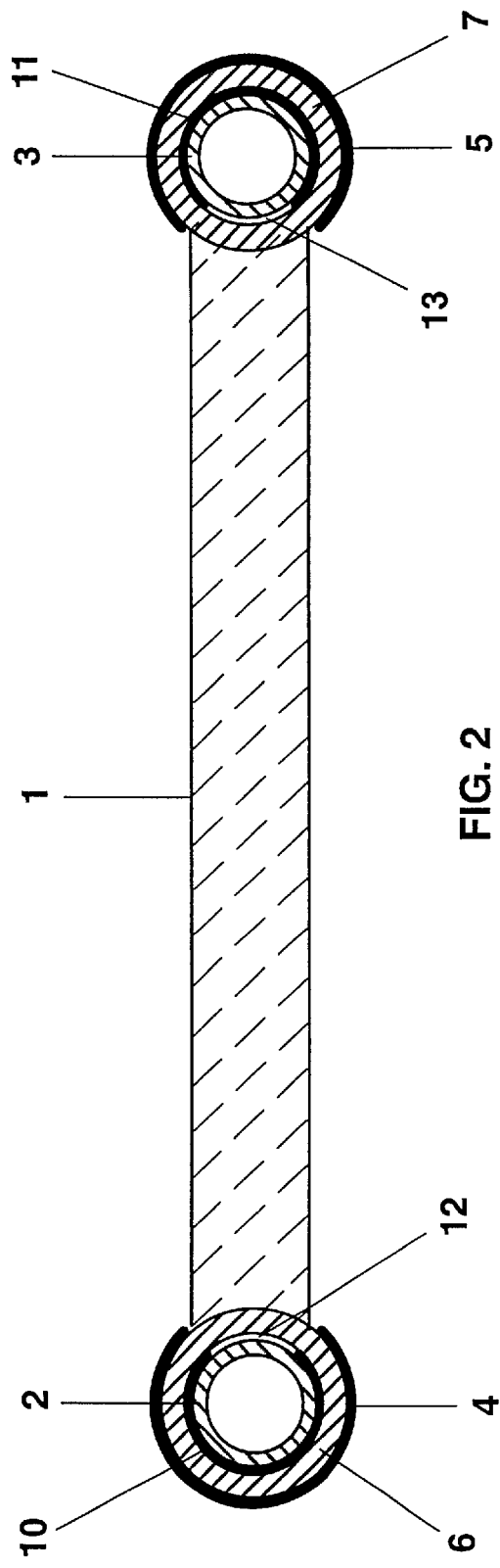

DIMMABLE LIGHTING APPARATUS

The invention relates to a lighting apparatus for display back-lighting.

PRIOR ART

Such a lighting apparatus has been disclosed, for example, by European laid-open Specification EP 0 607 453 A1. This specification describes a display back-lighting which comprises an essentially rectangular, translucent panel and an L-shaped fluorescent lamp. The fluorescent lamp rests on two edges of the translucent panel. Both legs of the L of the lamp are provided with a screen designed as a reflector.

DESCRIPTION OF THE INVENTION

The object of the invention is to provide a lighting apparatus, especially a display back-lighting, with a continuously variable brightness.

The lighting apparatus according to the invention possesses at least one electric lamp and a translucent, light-diffusing panel having at least one edge extending in a straight line, along which the at least one electric lamp is arranged and is fixed by means of a mounting. The at least one electric lamp is, according to the invention, designed as an aperture lamp having a cylindrical lamp envelope which is mounted in the mounting to rotate about its cylindrical axis. Furthermore, the lighting apparatus advantageously possesses a light absorber, which absorbs the light emitted by the at least one aperture lamp and not input into the light-diffusing panel. By rotation of the at least one aperture lamp about its axis, the quantity of light input into the light-diffusing panel can be continuously varied and the brightness of the lighting apparatus set accordingly. Maximum brightness is obtained if the aperture of the aperture lamp faces the edge of the light-diffusing panel with its entire width. By rotation of the at least one aperture lamp, the effective width of the aperture is reduced and the light input into the light-diffusing panel is reduced in accordance with the angle of rotation. The light absorber absorbs the fraction of the light emitted by the at least one aperture lamp which is not input into the light-diffusing panel.

Advantageously, the lighting apparatus according to the invention possesses an operating unit provided with a dimmer circuit for the at least one electric lamp. As a result, the lighting apparatus according to the invention can be dimmed not only mechanically but also electrically and an even finer gradation of brightness achieved. The mounting of the at least one electric lamp is advantageously designed as a tube enclosing the lamp and moulded onto the at least one edge extending in a straight line. In this case, the light absorber advantageously consists of an opaque coating of the tubular mounting. The light absorber may, however, also advantageously be designed as an opaque screen for the at least one electric lamp, which is for example snapped onto the lamp envelope or otherwise fixed to the lamp or to the diffusing panel. The width of the aperture of the at least one aperture lamp is advantageously matched to the thickness of the light-diffusing panel, in order to ensure minimal radiation of light in directions other than towards the panel edge. Advantageously, the lighting apparatus according to the invention is equipped with a rotary apparatus for rotating the at least one lamp about its axis and with a setting wheel for actuating the rotary apparatus. The setting wheel is advantageously additionally linked to the dimmer circuit. As a result, the lighting apparatus is simultaneously dimmed mechanically and electrically.

According to the particularly preferred example of embodiment of the invention, the lighting apparatus possesses a light-diffusing panel with two mutually opposite edges extending in a straight line, along each of which an aperture lamp is arranged. As a result, a uniform distribution of brightness over the light-diffusing panel is achieved. The rotary apparatus is preferably connected to the two aperture lamps in a manner such that the actuation of the setting wheel triggers a simultaneous rotary movement of the two lamps in opposite directions about their respective axes.

BRIEF DESCRIPTION OF THE DRAWINGS

FIG. 1 shows a cross section through a lighting apparatus according to the preferred example of embodiment of the invention in a diagrammatic illustration, dimmed operating state; and FIG. 2 shows a cross section through a lighting apparatus according to the preferred example of embodiment of the invention in a diagrammatic illustration, undimmed operating state.

DESCRIPTION OF THE PREFERRED EMBODIMENT

The lighting apparatus according to the preferred example of embodiment of the invention is a display back-lighting. It comprises a rectangular, transparent, light-diffusing panel 1, two aperture lamps 2, 3, each having an elongate, cylindrical lamp envelope, one light absorber 4, 5 for each of the two lamps 2, 3, an operating unit (not shown) equipped with a dimmer circuit for the lamps 2, 3, and a rotary apparatus (not shown) provided with a setting wheel (not shown) for rotating the lamps about their respective axes. The light-diffusing panel 1 is equipped on each of its long sides with a moulded-on, tubular mounting 6, 7 for, in each case, one of the two aperture lamps 2, 3. The tubular mountings 6, 7 enclose the lamps 2, 3 over the entire length of their lamp envelopes. The tubular mountings 6, 7 are each provided over their entire length with an opaque coating 4, 5, so that the light emitted by the lamps 2, 3 can only reach the longitudinal edges of the light-diffusing panel 1. Light which is emitted by the lamps 2, 3 in directions other than towards the longitudinal edge of the light-diffusing panel 1 is absorbed by one of the opaque coatings 4, 5. The two lamps 2, 3 are mounted in the tubular mountings 6, 7 to rotate about their cylindrical axis. By actuating the rotary apparatus connected to the two lamps 2, 3 by means of the setting wheel, the lamps 2, 3 are rotated simultaneously through the same angle, though in opposite directions, about their cylindrical axes. The aperture lamps 2, 3 are preferably low-pressure discharge lamps, for example fluorescent lamps, or xenon-excimer lamps which are operated via a common operating unit which is equipped with a dimmer circuit. Each of these aperture lamps 2, 3 possesses a tubular, cylindrical lamp envelope. The lamp envelopes of the two aperture lamps 2, 3 are provided on their outsides over their entire length and over the majority of their circumference with an opaque layer 10, 11. The translucent, uncoated part of the lamp envelope, which is designated as the aperture 12, 13, extends over a narrow strip in the longitudinal direction of the aperture lamp 2, 3 in question. The width of the aperture 12, 13 in both lamps 2, 3 is matched to the thickness of the light-diffusing panel 1. It extends through a circumferential angle of about 60 degrees and is matched to the thickness of the light-diffusing panel 1. The length of the aperture 12, 13 is matched to the length of the longitudinal edges of the light-diffusing panel 1. The lamp envelopes of the aperture lamps 2, 3 rest on the longitudinal edges of the light-diffusing panel 1.

The translucent, light-diffusing panel 1 appears at maximum brightness when the apertures 12, 13 of the two lamps 2, 3 rest on the respective longitudinal edges of the light-diffusing panel 1. In this case, the majority of the light generated by the two lamps 2, 3 is input into the light-diffusing panel 1 via the longitudinal edges. This case is shown in FIG. 2. In FIG. 1 the lamps 2, 3 have been rotated in opposite directions through an angle of approximately 30 degrees relative to the position in FIG. 2. The effective aperture 12, 13 here is only about 50% of its maximum value for both lamps 2, 3. The input of light into the light-diffusing panel 1 is therefore reduced accordingly. In addition, via the setting wheel, which is linked for example via a potentiometer to the dimmer circuit, the electrical power uptake of the two lamps 2, 3 is also reduced. The rotary apparatus for the rotation of the lamps 2, 3 in opposite directions about their axes is produced in a known manner, for example by means of a toothed belt or by means of a shaft. In order to operate the two lamps 2, 3, commercial operating units with dimmer devices may be used.

What is claimed is:

1. A lighting apparatus comprising:
   a translucent, light-diffusing panel having at least one edge extending in a straight line;
   at least one lamp arranged along the at least one edge extending in a straight line and fixed to the translucent, light-diffusing panel by a mounting, the mounting having a light absorber;
   the at least one lamp comprising an aperture lamp having a cylindrical lamp envelope; and
   the at least one lamp being mounted in the mounting to rotate about its cylindrical axis.

2. The lighting apparatus of claim 1 wherein the lighting apparatus has a light absorber which absorbs the portion of the light emitted by the at least one lamp which is not input into the translucent, light-diffusing panel.

3. The lighting apparatus of claim 1 wherein the mounting is a tube enclosing the at least one lamp, the mounting being molded onto the at least one edge extending in a straight line.

4. The lighting apparatus of claim 1 wherein the light absorber is an opaque screen.

5. The lighting apparatus of claim 4 wherein the opaque screen is an opaque coating on the mounting.

6. The lighting apparatus of claim 1 wherein the width of the aperture of the at least one lamp is matched to the thickness of the translucent, light diffusing panel.

7. The lighting apparatus of claim 1 wherein the translucent, light diffusing panel possesses two mutually opposite edges extending in a straight line and the lighting apparatus possesses two lamps, each of which is arranged along one of the edges extending in a straight line.

8. The lighting apparatus of claim 7 wherein the two lamps rotate simultaneously in opposite directions about their respective cylindrical axes.

9. The lighting apparatus of claim 1 wherein the aperture of the at least one lamp is a strip in extending in longitudinal direction of the at least one lamp.

10. The lighting apparatus of claim 9 wherein the width of the aperture of the at least one lamp is matched to the thickness of the translucent, light diffusing panel.

11. The lighting apparatus of claim 1 wherein the lamp(s) are electrically dimmable.

12. The lighting apparatus of claim 11 wherein the lamp(s) are electrically dimmed and rotated simultaneously.

13. A lighting apparatus comprising:
    a translucent, light-diffusing panel having an edge extending in a straight line;
    a lamp having a cylindrical envelope, an opaque layer on the envelope, and an aperture in the opaque layer extending in a narrow strip in the longitudinal direction of the lamp, the width of the aperture being matched to the thickness of the panel, the lamp being arranged along the edge extending in a straight line; and
    a tubular mounting enclosing the lamp, the tubular mounting being affixed to the edge of the panel and having a light absorber, the light absorber positioned to absorb light emitted by the lamp and not input into the light-diffusing panel, the lamp being mounted to rotate about its cylindrical axis.

14. The lighting apparatus of claim 13 wherein the length of the aperture is matched to the edge of the panel.

15. A lighting apparatus comprising:
    a translucent, light-diffusing panel having mutually opposed edges extending in a straight line;
    two lamps, each having a cylindrical envelope, an opaque layer on the envelope, and an aperture in the opaque layer extending in a narrow strip in the longitudinal direction of the lamp, the width of the aperture being matched to the thickness of the panel, each lamp being arranged along one of the edges extending in a straight line; and
    two tubular mountings, each enclosing one of the lamps, each tubular mounting being affixed to one of the edges of the panel and having a light absorber, the light absorber positioned to absorb light emitted by the lamp and not input into the light-diffusing panel, each lamp being mounted to rotate about its cylindrical axis.

16. The lighting apparatus of claim 15 wherein the lamps rotate simultaneously in opposite directions.

* * * * *